Dec. 3, 1968 K. WILFERT ET AL 3,414,290

VEHICLE SUSPENSION SYSTEM

Filed Sept. 7, 1966

INVENTORS
KARL WILFERT
BELA BARENYI

BY *Dicke + Craig*

ATTORNEYS

3,414,290
VEHICLE SUSPENSION SYSTEM
Karl Wilfert, Gerlingen-Waldstadt, and Béla Barényi, Stuttgart-Vaihingen, Germany, assignors to Daimler-Benz Aktiengesellschaft, Stuttgart-Unterturkheim, Germany
Filed Sept. 7, 1966, Ser. No. 577,760
Claims priority, application Germany, Sept. 11, 1965, D 48,185
6 Claims. (Cl. 280—112)

ABSTRACT OF THE DISCLOSURE

A wheel suspension with the opposite wheel axes each being inclined upwardly and outwardly to provide a constant wheel track and counteract centrifugal force during turning, with the wheel axle being mounted within a transverse support member for pivotal movement about a transverse axis; the support member being mounted to the vehicle superstructure for pivotal movement about a longitudinal axis.

Background of the invention

Rigid axles have the advantage that the wheel tread remains constant during all spring suspension movements. Similar advantages are afforded also by a wheel suspension by means of crank axle guides which are positioned pivotally along a transverse axis which is offset with respect to the central wheel axis in the longitudinal vehicle direction.

One advantage of the swinging half axles resides, among others, in that the wheels will assume, during the stroke, a position which is downwardly outwardly inclined with respect to the roadway, which improves the lateral guide of the wheels, since the resultant force from weight and centrifugal force arising particularly in the traversing of curves is approximated to the wheel plane to a greater or lesser extent so that, due to the pressure force of the rubber, the tire can absorb these forces more favorably in the radial direction than wheel arrangements in which the rubber of the tires is stressed while being laterally pinched or squeezed.

Summary of the invention

The present invention aims at the combination of the advantages of a rigid-axle and, respectively, the individual wheel suspension by means of crank axles guides, on the one hand, and of swinging half axles on the other hand, but without involving the disadvantages thereof, and consists essentially in that the spindles or pivots carrying the wheels are disposed in an outwardly sloping manner in the transverse vehicle direction.

The wheel suspension proposed by the present invention affords the particular advantage that the wheel being positioned on the outside toward the curve and which is stressed more severely in the curve is inclined more or less markedly in dependence upon the resultant force from weight and centrifugal force; and, in contrast to the swinging half axle construction is specifically independent of the degree of deflection thereof so that the direction of this force will form a smaller angle with the central longitudinal plane of the wheel. The wheel which, in a manner of speaking, opposes the forces being produced may therefore absorb this force more closely to the favorable radial direction of the wheel. As a result thereof, the deformations of the tire, which are very strong particularly when the vehicle drives through sharp curves and which impair the service life of the wheel and can even be dangerous under certain conditions, may be reduced.

Additionally, there is obtained with the arrangement of the present invention the advantage of an increase in the wheel track—while the internal distance of the wheels with respect to one another and the weight of the axle remain the same—and therewith an increased safety against tilting of the vehicle, as well as, due to the greater lever arm being determined by the wheel tread, a smaller change in camber of the wheels when one pair of wheels is lifted on one side. Simultaneously therewith, the gyro effect of the wheels changing their inclination is also reduced. Furthermore, the radius of gyration as well as the swinging mass of the wheel which is reduced together with the inclination of the spindle or pivot axis when one wheel is lifted to one side.

A further advantage of the wheel suspension as proposed by the present invention consists in that it constitutes the most favorable provision against soiling of the outer vehicle sides; namely, in contrast to the swinging half axle, under all conditions of load or stress, as a result of the centrifugal force acting on the wheels and the angle of inclination thereof, the dirt raised by the wheels is spattered always in the wheel plane from below exclusively into the wheel housings which cover the wheels and not outwardly along the outer vehicle sides.

It is an object of the present invention to provide a new and advantageous wheel suspension arrangement for motor vehicles.

It is another object of the present invention to provide a wheel suspension arrangement for motor vehicles which combines the advantages of rigid axle arrangements and swinging half axle arrangements.

It is a further object of the present invention to provide a wheel suspension arrangement which will make possible a more favorable absorption of forces on the vehicle tires when passing through a curve.

It is still another object of the present invention to provide a wheel suspension arrangement which increases the wheel track while maintaining the standard distance between wheel centers and the standard weight of the axle.

It is a still a further object of the present invention to provide a wheel suspension arrangement which reduces soiling of the lateral vehicle body parts due to novel disposition of the wheels.

Brief description of the drawing

These and other objects, features and advantages will become more apparent from the following detailed description of the invention when taken in conjunction with the accompanying drawings which illustrate two exemplary embodiments of the invention, and wherein.

Detailed description of the drawing

Figure 1:
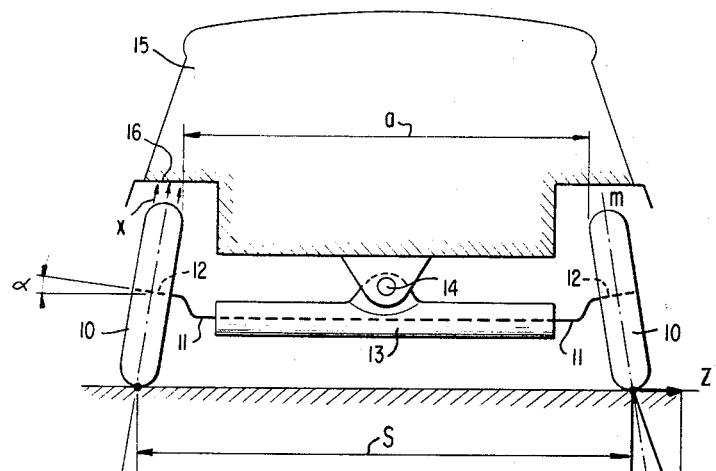
FIGURE 1 illustrates the use of the present invention in connection with a rigid axle.

In FIGURE 1, the wheels 10 are positioned on a rigid axle 11 which is bent or cranked either to the front or to the rear, and which is provided at the ends thereof with crank axle guides 12 serving for supporting and positioning the wheels. The rigid axle 11 is positioned in a transverse member 13 having, for example, a tubular configuration and being, in turn, pivotally arranged about a longitudinal axis 14 at the vehicle superstructure 15 of a self-supporting body construction of any conventional configuration. The wheel axle 11 may, however, be provided at the vehicle superstructure 15 in a different manner than specifically indicated in FIGURE 1. For example, it may be provided in the conventional manner as a straight continuous rigid axle, and may be suspended, for example, by means of longitudinal or transverse leaf-type springs, and the shock absorption of the rigid axle and, respectively, of the transverse member may be formed as desired also in other respects.

According to the present invention, the wheel spindles or guides 12 are slopingly outwardly and upwardly oriented at an angle $\alpha$ with respect to a horizontal transverse axis through the vehicle.

The result is that the wheels 10 are inwardly inclined at an angle corresponding to this angle $\alpha$ with respect to a vertical longitudinal plane of the vehicle. With a given distance $a$ between the upper points of the wheels 10 which are positioned inwardly to the greatest extent, this results in an increased wheel tread or track width $s$ as compared to the conventional wheel arrangement.

When the vehicle travels through a curve so that, for example, a centrifugal force Z must be absorbed at one of the two vehicle wheels 10, there will be produced, with a weight portion G allotted to this wheel, a resultant R which defines an angle $\beta$ with respect to the vertical line and respectively, with the force G in accordance with the forces Z and G. As a result of the inclination of the wheel 10, this force may be absorbed particularly safely by the tire of the wheel since the direction of the force R is more or less closely approximated to the direction of the plane $m$—$m$ of the wheel inclined at the angle $\alpha$, and this approximation becomes more precise within specific limits, i.e., depending upon the size of the angle, $\alpha$ at the higher traveling speeds so that the angle $\gamma=\beta-\alpha$ may possibly also assume the value zero, which is the ideal condition.

As a result of the upwardly inwardly inclined position of the wheels, any dirt raised by the latter will always be thrown by centrifugal force inwardly in the direction $x$ against the inside of the wheel housing 16, independently of the load and the degree of deflection of the vehicle suspension system, so that the outside of the automobile body will not be hit thereby. Consequently, the vehicle remains essentially cleaner, particularly also during high speeds.

Figure 2:
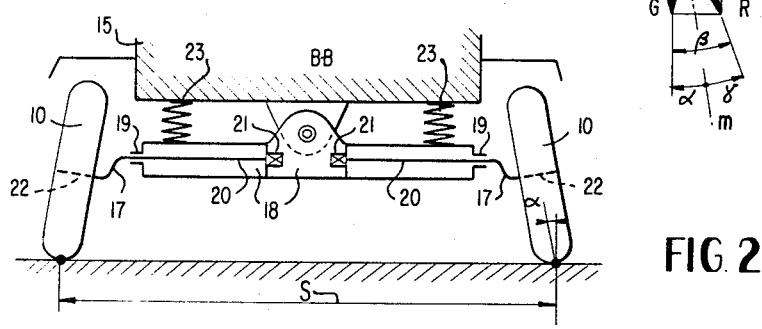
FIGURE 2 illustrates the use of the present invention in connection with a wheel suspension wherein the wheels are suspended at individual crank axle guides which swing about a transverse vehicle axis being offset with respect to the central wheel axis.
Figure 3:
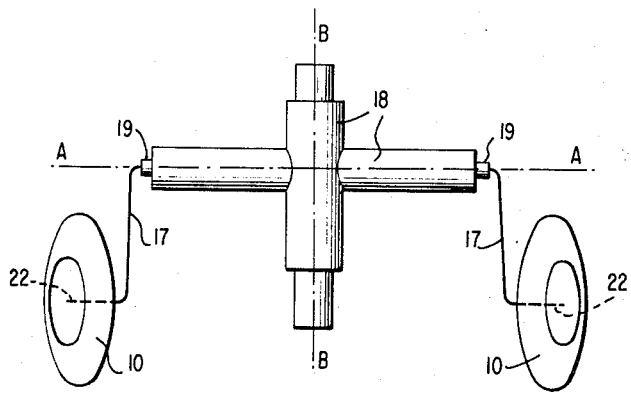
FIGURE 3 is a top plan view with regard to FIGURE 2.

The embodiment according to FIGURES 1 and 2 illustrates a corresponding arrangement for an independent wheel suspension. The wheels 10 are disposed therein on separate crank axle guides 17 which are rotatably positioned at 19 in the transverse vehicle axis A—A which is offset with respect to the central axle of the wheels, as seen in FIG. 3, in a housing 18 which is pivotally positioned at the vehicle superstructure 15 about the longitudinal vehicle axis B—B. The axle guides are extended, for example, beyond the bearing 19 inwardly in the form of torsion spring rods 20 which are rigidly clamped at 21 within the housing 18. The spindles or pivots 22 at the crank axle guides 17 are again inclined at an angle $\alpha$ so that the wheels 10 also have a corresponding inclination with respect to the vertical longitudinal plane.

In the place of or co-extensive with the torsion springs 20, it is possible to also provide any other springs between the wheels and the housing 18, and, respectively, a corresponding bearing part, such as, for example, torsion springs for the shock absorption of the oscillating movements about the longitudinal axis B—B. Helical springs 23 are schematically illustrated in the drawing for this purpose.

If the two torsion rods 20 are replaced by a single continuous torsion rod in the manner of a stabilizer, further springs are required which cushion the crank axle guides 17 against the housing 15 or the bearing part 18. Also rubber shock absorbers, for example, could be employed therefor which are arranged next to the bearing 19 within the housing and which cushion the pivot pins of the crank axle guides 17 against the housing in the torsional direction.

While we have shown and described several embodiments in accordance with the present invention, it is understood that the same is not limited thereto, but is susceptible of numerous changes and modifications as known to a person skilled in the art; and we therefore do not wish to be limited to the details shown and described herein; but intend to cover all such changes and modifications as are encompassed by the scope of the appended claims.

We claim:

1. A wheel suspension for vehicles, comprising: a vehicle superstructure; two oppositely positioned wheels of a wheel pair, each having a wheel center axis of rotation; a rigid axle; means mounting said two wheels on the rigid axle with said wheel center axes of the two oppositely positioned wheels forming an oblique angle with each other in a common vertical plane, said wheel center axes each being inclined upwardly and outwardly; and means suspending said rigid axle at the vehicle superstructure for upward and downward movement deflecting the wheels relative to the vehicle superstructure with the wheel track width remaining constant.

2. The wheel suspension according to claim 1, wherein said suspending means mounts said rigid axle for pivotal movement about a longitudinal axis extending in the driving direction of the vehicle and about a transverse axis longitudinally offset with respect to said wheel center axes.

3. A wheel suspension for vehicles, comprising: a vehicle superstructure; two oppositely positioned wheels of a wheel pair having wheel center axes of rotation; axle means mounting the two wheels with said wheel center axes of the two oppositely positioned wheels each being inclined upwardly toward the outside at a substantial angle; and means suspending said axle means at the vehicle superstructure for upward and downward pivoting movement of said wheels about a single common transverse axes longitudinally offset with respect to said wheel center axes.

4. The wheel suspension according to claim 3, wherein said axle means is a single rigid axle member having crank axle guides extending at its opposite ends in the longitudinal direction of the vehicle to free ends formed as wheel mounting spindles coaxial with and determining respective ones of said wheel center axes; said wheel center axes intersecting and lying in a common transverse plane of the vehicle; said suspending means including an axle support pivotally carrying therein the center portion of said rigid axle member; and said axle support being pivotally mounted to said superstructure for pivotal movement about a central longitudinal axis.

5. The wheel suspension according to claim 4, wherein said crank axle guides are rigid and rigidly connected with said rigid axle member.

6. The wheel suspension according to claim 3, wherein said suspending means includes a tubular axle housing pivotally connected to said superstructure for movement about a central longitudinal axis extending in the direction of vehicle driving; spring means for resiliently resisting movement of said housing about said longitudinal axis; said axle means including a half axle for each of said wheels; each of said half axles comprising a transversely extending torsion rod within said housing having its inner end rigidly connected to said housing and its outer end rotatably mounted with respect to said housing, said outer end being rigid integral with a generally longitudinally extending crank axle guide having a rigid integral spindle coaxially mounting the respective wheel and determining said wheel center axes.

(References on following page)

References Cited

UNITED STATES PATENTS

| | | | |
|---|---|---|---|
| 2,732,902 | 1/1956 | Barenyi | 280—112 |
| 3,220,502 | 11/1965 | Muller | 280—124 |
| 3,301,572 | 1/1967 | Tapp et al. | 280—111 |
| 3,014,547 | 12/1961 | Van Der Lely | 280—80 |

FOREIGN PATENTS 1,095,983 6/1955 France.

BENJAMIN HERSH, *Primary Examiner.*

L. D. MORRIS, JR., *Assistant Examiner.*